United States Patent [19]
Thornton

[11] Patent Number: 5,966,056
[45] Date of Patent: Oct. 12, 1999

[54] METHOD AND APPARATUS FOR ENABLING THE TRANSMISSION OF MULTIPLE WIDE BANDWIDTH ELECTRICAL SIGNALS

[75] Inventor: Barry Thornton, Austin, Tex.

[73] Assignee: INT Labs, Inc., Austin, Tex.

[21] Appl. No.: 08/674,626

[22] Filed: Jul. 3, 1996

Related U.S. Application Data

[60] Provisional application No. 60/010,662, Jan. 26, 1996.

[51] Int. Cl.$^6$ ................................................ H01P 3/04
[52] U.S. Cl. ........................ 333/5; 333/236; 174/32; 174/34; 348/8; 348/12
[58] Field of Search ........................... 333/4, 5, 236; 174/34, 32, 113 R; 379/90.01, 93.01; 348/8, 12; 455/3.1, 6.3

[56] References Cited

U.S. PATENT DOCUMENTS

| | | |
|---|---|---|
| 1,467,360 | 9/1923 | Elsasser . |
| 1,751,333 | 3/1930 | Jordan et al. . |
| 2,086,629 | 7/1937 | Mead ................................... 174/113 R |
| 3,815,054 | 6/1974 | McClure et al. ............................. 333/5 |
| 4,527,135 | 7/1985 | Piper ........................................... 333/5 |
| 5,064,966 | 11/1991 | Palmer ....................................... 174/32 |
| 5,304,856 | 4/1994 | Rainal ..................................... 333/4 X |
| 5,321,372 | 6/1994 | Smith ........................................... 333/1 |
| 5,379,005 | 1/1995 | Aden et al. ............................. 333/24 R |

FOREIGN PATENT DOCUMENTS

| | | | |
|---|---|---|---|
| 644871 | 10/1928 | France ...................................... 174/34 |
| 355900 | 6/1938 | Italy ............................................ 333/5 |

*Primary Examiner*—Benny T. Lee
*Attorney, Agent, or Firm*—Haynes and Boone, L.L.P.

[57] ABSTRACT

Method and apparatus for enabling the transmission of high bandwidth analog and digital data over cable lengths of more than 1000 feet through low cost semishielded or unshielded four wire cable are disclosed. Three balanced mode signals are transmitted using four conductors. In this configuration, the components A+ and A− of a first balanced mode signal A are respectively carried on a first pair of conductors, the components B+ and B− of a second balanced mode signal B are respectively carried on a second pair of conductors, and the components C+ and C− of a third balanced mode signal C are respectively carried on a pair of conductors synthesized through the commonality of the first and second conductor pairs, respectively. Using this technique, a new additional virtual ground plane is created wherein signal energy can be transmitted without interfering or combining with the other signals being transmitted on the remaining conductor pairs.

37 Claims, 9 Drawing Sheets

METHOD AND APPARATUS FOR ENABLING THE TRANSMISSION OF MULTIPLE WIDE BANDWIDTH ELECTRICAL SIGNALS

This application claims benefit of Provisional Appl. No. 60/010,662, filed Jan. 26, 1996.

TECHNICAL FIELD

The invention relates generally to the transmission of analog and digital signals and, more particularly, to a method and apparatus for enabling the transmission of high bandwidth analog and digital data over cable lengths of more than 1000 feet through low cost semishielded or unshielded four wire cable.

BACKGROUND OF THE INVENTION

A major barrier to the growth and expansion of the consumer or home connectivity market ("consumer market"), particularly with respect to the ability easily to transmit video and audio signals throughout the home for the purpose of expanding access to a home entertainment system, as well as to media services such as satellite, cable, and telephone services from the outside Service Providers, has been the problem of internal wiring. This in turn results in a barrier to the creation of a cost-effective "smart home." In the consumer market, the primary issue limiting growth has been the diversity of signals that must be transmitted and the specialized requirements associated with the transmission of each type of signal. As a result of these various requirements, installation of smart home wiring necessarily includes a variety of cables, each with its own particular performance, termination, and installation problems. Due to the wide range of signals and the expertise needed to install the cabling, the consumer connectivity market has been limited to the domain of specialized sales, installation and retail operations. Because of the specialization of skills and tools required for the installation process, the cost of installation as either a retrofit to an existing site or as an original part of a new home is great enough that this market remains somewhat of a niche market, representing only the tip of the iceberg of the interest and demand of the consumer market. To become a truly significant market, this wiring problem must be solved to the point of permitting home installation and use by the individual consumer. Ideally, the technology must be simple enough to be mass marketed through retail outlets.

In addition to the consumer market, the office-place would benefit from technology that would enable computer images, referred to as red, green and blue ("RGB") or video graphics adapter ("VGA") signals, and audio to be transmitted throughout the office without the need for installing a variety of additional cables and wiring. One application for such technology would be the ability to permit someone else in the office building to view the output of another person's computer monitor on his own monitor, while enabling a hands-free voice intercom for discussion of same. This would enable both parties to view the same monitor output in real time. The "viewer" would be able to watch the other party's mouse movements, cursor activity, typing, and such, just as if they were standing behind the person and looking over the shoulder. At the present time, the above-described objectives could be achieved through use of a computer information network; however, this would be considered by most to be a questionable use of valuable network time. In particular, if a first user wants to obtain a copy of a document a second user is working on, the first user must download the document through the network server, in which case a copy of the document exists on the first user's computer, which may be undesirable for security reasons, and the second user cannot access the document until it is closed by the first user.

Alternatively, specialized cabling could be installed for achieving the aforementioned objectives. However, the installation of the necessary wiring would be extremely expensive, not to mention time consuming. Moreover, older buildings typically will not be able to withstand the added weight of the additional cables and wiring, in which case existing wiring must be removed before the new wiring can be installed, resulting in a great deal of added expense. Clearly, neither of these are acceptable results.

Another application that is presently implemented only through the installation and use of specialized wiring is teleconferencing, which is presently accomplished through a mobile teleconferencing system or a specialized room or site, in which case the hardware and outside interface equipment are not located in a secure and electronically proper room. Clearly, it would be beneficial to be able to have the hardware and interface equipment located in a dedicated, secure room remote from the location in which the teleconference is actually taking place.

Other areas in which it would be beneficial to have an uncomplicated way to distribute video data and audio signals include education and training applications, medical and scientific image distribution, and industrial applications.

Figure 1:
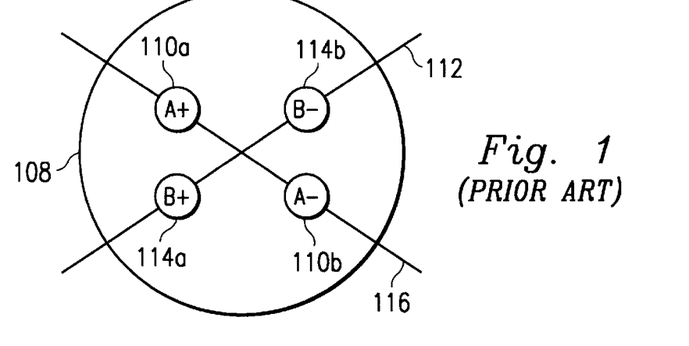
FIG. 1 illustrates a prior art method of winding four conductors together as a single cable for transmitting two signal pairs thereon.

Prior art techniques for enabling the transmission of wide bandwidth signals through copper cable has been to employ balanced mode transfer techniques, wherein two dedicated conductors are required to transmit each signal. Therefore, the number of conductors required to transmit M signal channels is 2M. Using this technique, four conductors are wound together in an opposite mode pattern as a single cable and the two virtual ground planes generated by the cable configuration are used to isolate the signal pairs. FIG. 1 illustrates a cable 108 configured in such a manner. As shown in FIG. 1, the components A+, A−, of a first balanced mode signal A are respectively applied to a first pair of conductors 110a, 110b, thereby creating a virtual ground plane 112. The components B+, B−, of a second balanced mode signal B are respectively applied to a second pair of conductors 114a, 114b, and create a virtual ground plane 116. It should be noted that the first pair of conductors 110a, 110b, are positioned such that they lie in the virtual ground plane 116, while the second pair of conductors 114a, 114b, are positioned such that they lie in the virtual ground plane 112. In this manner, energy occurring in the virtual ground plane of one of the signals is not induced into the energy transfer of the other. In other words, conductor pairs 110a, 110b, and 114a, 114b, and the respective signals carried thereon are electrically isolated from one another.

Clearly, the prior art technique illustrated in FIG. 1 suffers certain deficiencies, not the least of which is the high conductor-to-signal ratio, making the technique costly and inefficient. Moreover, each cable is capable of carrying only two signal channels. To carry three signal channels, therefore, an additional conductor pair must be installed. This can be accomplished by using three individual shielded twisted pair cables using the shield for inter-channel isolation. Unfortunately, this solution, while conceptually simple, is expensive, cumbersome, and, because it requires the installation of additional cables, labor intensive An alternative would be to add two additional conductors to the cable 108 of FIG. 1; however, the addition of conductors in this manner inhibits the use of the virtual ground planes created by the conductor pairs to isolate the signals from one another, as the virtual ground planes are generated in the wrong location to effectively isolate the pairs. In other words, in a six-conductor arrangement, the conductors cannot be arranged such that each pair lies in the virtual ground plane of another pair, making this so-called "solution" practically ineffective.

Therefore, what is needed is a low-cost, simple technique for enabling the transfer of high bandwidth analog or digital data over cable lengths up to and greater than 1000 feet.

SUMMARY OF THE INVENTION

The present invention, accordingly, provides a method and apparatus for enabling the transmission of high bandwidth analog and digital data over cable lengths of more than 1000 feet through low cost semishielded or unshielded four wire cable, thereby overcoming or reducing disadvantages and limitations associated with prior methods and systems.

In a preferred embodiment, three balanced mode signals are transmitted using four conductors. In this configuration, the components A+ and A− of a first balanced mode signal A are respectively carried on a first pair of conductors, the components B+ and B− of a second balanced mode signal B are respectively carried on a second pair of conductors, and the components C+ and C− of a third balanced mode signal C are respectively carried on a pair of conductors synthesized through the commonality of the first and second conductor pairs, respectively. Using this technique, a new additional virtual ground plane is created wherein signal energy can be transmitted without interfering or combining with the other signals being transmitted on the remaining conductor pairs.

In one aspect of the invention, an encode, or send, resistor matrix, comprises sources for generating each of the components of the three balanced mode signals and eight equal resistors. Each of four conductors carries the summed current of two of the source signal components. Additionally, each of four resistor pairs comprising the eight resistors function so as to create summing nodes at the conductors. The components of the signal C are shared by the first and second pairs of conductors.

In another aspect of the invention, a decode, or receive, resistor matrix essentially undoes the signal matrixing that occurred at the send matrix. The respective outputs are fed to balanced detectors offering high common mode rejection.

In yet another aspect of the invention, the number of conductors used to implement the technique of the present invention is symmetrically expandable in units of $4^n$, where n is a natural number without limit, with a signal-to-conductor ratio of (N-1)-to-N, where N is the number of conductors $4^n$. Therefore, fifteen signals can be transmitted using sixteen ($4^2$) conductors, 63 signals can be transmitted using 64 ($4^3$) conductors, and so on.

Two additional attributes of the technique are that it enables "piggybacking" and "bidirectionality." Piggybacking is the process by which a low-bandwidth signal, such as a remote control signal, is added onto a higher bandwidth signal, such as a television signal. Bidirectionality is a process by which signals can be sent in opposite directions simultaneously on the same cable to enable activities such as teleconferencing, video intercom, computer data communication, and the like.

A technical advantage achieved with the invention is that it can be implemented using existing surplus telephone wiring in a building, such that no additional cabling is necessary.

Another technical advantage achieved with the invention is that all signal transmission is performed in a balanced mode, providing extremely high external noise rejection.

Another technical advantage achieved with the invention is that the connector-to-channel ratio is that of a common ground unbalanced connectivity system.

Yet another technical advantage achieved with the invention is that it permits the use of very low performance cable and connectors for the connectivity of multiple high speed analog and digital signals and it enables the transmission of such signals through longer lengths of cable than are normally associated with the sources and signals involved.

Yet another technical advantage achieved with the invention is its cost effectiveness, in that it may be implemented using cheaper or preexisting cabling system for various applications, it extends the length of cable range without requiring many, if any, booster amplifiers, and it provides accessibility to points previously too distant for effective cabling.

Yet another technical advantage achieved with the invention is that it provides high common mode signal rejection, thereby eliminating noise that even shielded coaxial cable cannot eliminate.

Another technical advantage achieved with the invention is that its full floating signal transfer mode eliminates ground loops and AC mains power hum.

DETAILED DESCRIPTION OF THE PREFERRED EMBODIMENT

As previously described, FIG. 1 illustrates a prior art method of winding four conductors together as a single cable for transmitting two signal pairs, wherein two virtual ground planes created thereby are used for isolating the signal pairs.

Figure 2:
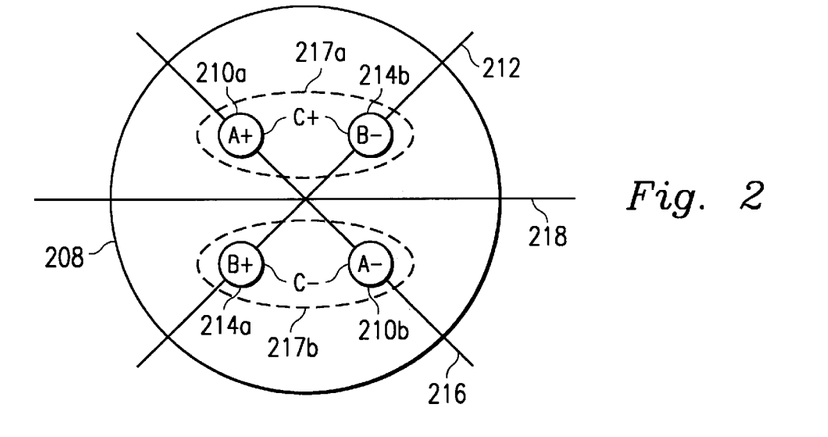
FIG. 2 illustrates a four-conductor cable configured for implementing the technique of the present invention.

As shown in FIG. 2, a cable 208, which is physically identical to the cable 108 shown in FIG. 1, comprises a first pair of conductors 210a, 210b, to which the components A+, A−, of a first balanced mode signal A are respectively applied, thereby creating a virtual ground plane 212, and a second pair of conductors 214a, 214b, to which the components B+, B−, of a second balanced mode signal B are respectively applied, thereby creating a virtual ground plane 216. As with the embodiment shown in FIG. 1, the first pair of conductors 210a, 210b, are positioned such that they lie in the virtual ground plane 216, while the second pair of conductors 214a, 214b, are positioned such that they lie in the virtual ground plane 212, such that conductor pairs 210a, 210b, and 214a, 214b, and the respective signals carried thereon are electrically isolated from one another.

In accordance with the features of the present invention, the components C+, C−, of a third balanced mode signal C are respectively applied to a third pair of conductors synthesized through the commonality of the conductor pairs 210, 214, and designated in FIG. 2 by reference numerals 217a, 217b, thereby creating a third virtual ground plane 218 wherein signal energy can be transferred without disturbing or corrupting the transmission of other signals being transmitted via the cable 208.

Figure 3:
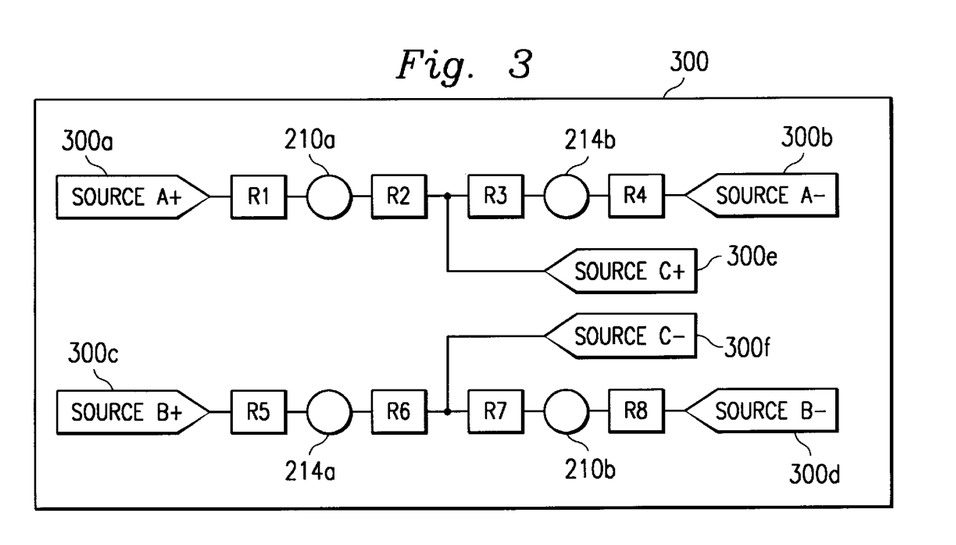
FIG. 3 is a block diagram of an encode, or send, resistor matrix of the present invention.

FIG. 3 illustrates an encode, or send, resistor matrix 300 for sending signals A+, A−, B+, B−, C+, and C−, on the conductors 210a, 210b, 214a, 214b. The matrix 300 comprises a plurality of low impedance balanced signal sources 300a, 300b, 300c, 300d, 300e and 300f for generating the signals A+, A−, B+, B−, C+, and C−, respectively and eight equal resistors R1–R8. As shown in FIG. 3, each resistor pair R1 and R2, R3 and R4, R5 and R6, and R7 and R8, functions so as to create summing nodes at the conductors 210a, 210b, 214a, 214b, and to set the back termination and natural impedance requirements of the cable. As a result, the signals C+ and C− are respectively shared by conductors 210a/214b and 210b/214a.

Figure 4:
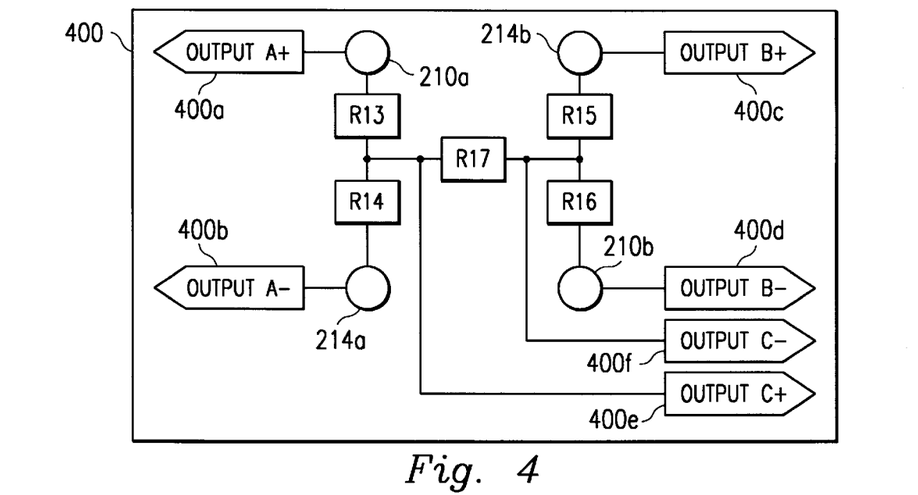
FIG. 4 is a block diagram of a decode, or receive, resistor matrix of the present invention.

FIG. 4 illustrates a decode, or receive, resistor matrix 400 for essentially undoing the signal matrixing performed by the send matrix 300. As shown in FIG. 4, the receive matrix 400 comprises outputs 400a, 400b, 400c, 400d, 400e and 400f (which are coupled as illustrated to the conductors 210a, 214a, 214b, 210b), for each of the signals A+, A−, B+, B−, C+ and C−, respectively, as well as five (5) resistors R13, R14, R15, R16 and R17. The resistors R13, R14, R15 and R16 function to create the null signal nodes resulting in the signals C+ and C−, and to set the back termination load for the cable. The resistor R17 functions as a back termination for the synthetic balanced cable impedance. Although not shown, it will be recognized that each of the outputs are fed to balanced detectors offering high common mode rejection.

Figure 5:
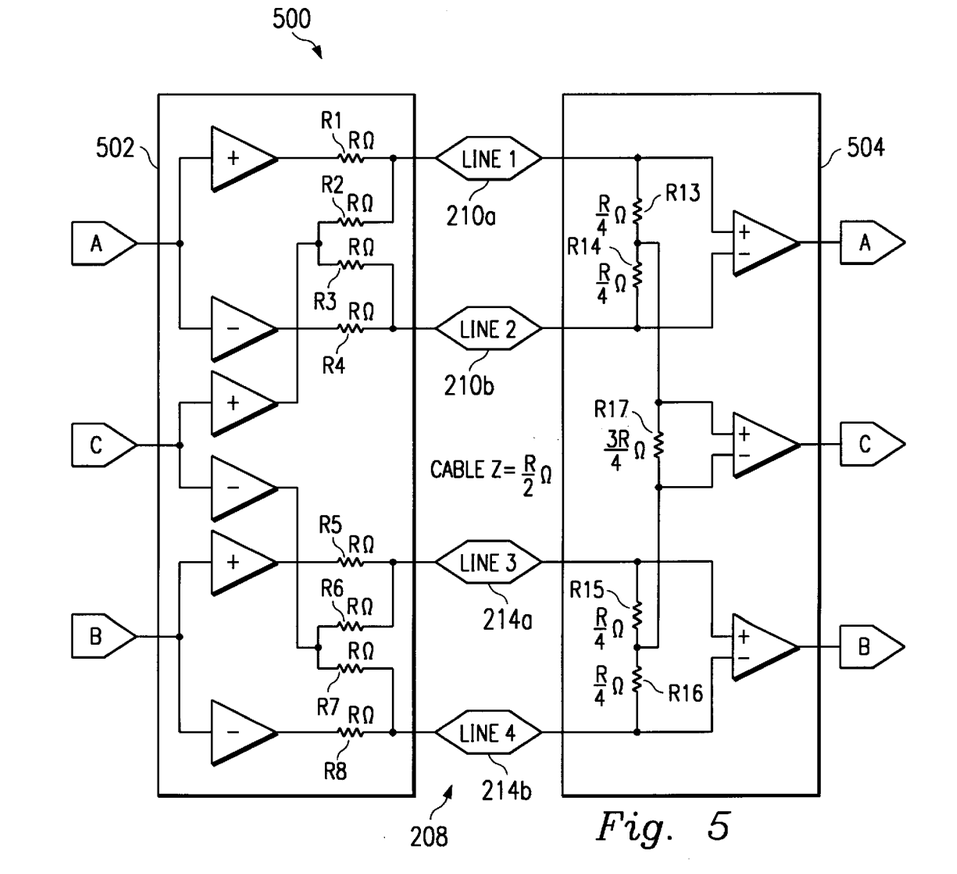
FIG. 5 is a schematic block diagram of the send and receive matrices of FIGS. 3 and 4.

FIG. 5 is a schematic block diagram of a complete system 500 embodying features of the present invention and comprising a send matrix 502 identical to the send matrix of FIG. 3, and a receive matrix 504 identical to the receive matrix of FIG. 4 and coupled to the send matrix 502 by the conductors 210a, 210b, 214a and 214b. As shown in FIG. 5, assuming that the impedance Z of the cable 208 comprised of the conductors 210a, 210b, 214a and 214b is R/2 ohms (Ω), the resistance of each of the resistors R1, R2, R3, R4, R5, R6, R7 and R8 in the send matrix 502 will be equal to R Ω, i.e., twice the impedance Z of the cable 208. In contrast, the resistances of the resistors R13, R14, R15, R16 in the receive matrix 504 will be equal to R/4 Ω, i.e., half the impedance Z of the cable 208. The load resistor R17 for signal C, which has a resistance of 3R/4 Ω, enables the independent adjustment of the adjacent conductor pairs while the load resistor pairs for signals A and B set the impedance of the opposite pairs.

Figure 6:
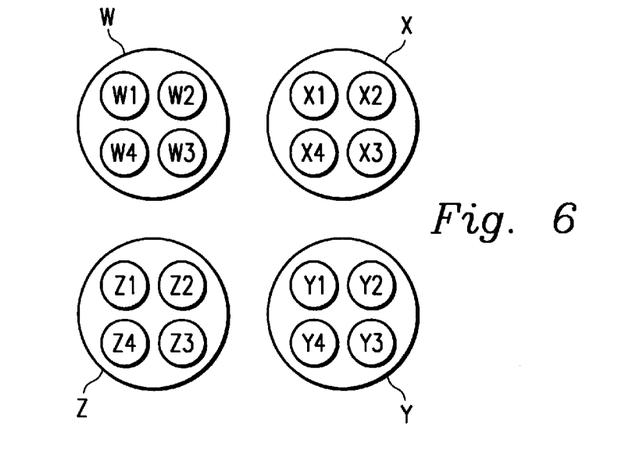
FIG. 6 illustrates the symmetric expandability of the system of the present invention.

As noted above, symmetric expandability is an additional advantageous feature of the present invention. In each of the Figures discussed above, the signal carrying medium was described as a four conductor cable, e.g., cable 208 (FIG. 2). It will be recognized, however, that a four conductor cable can be considered to be a single conductor in an expansion up to the next power of four. As shown in FIG. 6, this expands the signal density to fifteen channels for sixteen conductors. In this implementation, a cable consisting of four individual conductors W1–W4 is rematrixed for use as a composite conductor W. Similarly, cables each consisting of four individual conductors X1, X2, X3, X4; Y1, Y2, Y3, Y4; Z1, Z2, Z3, Z4; respectively, are rematrixed for use as composite conductors X, Y, and Z, respectively. In this manner, fifteen signals can be transmitted via 16 single conductors W1, W2, W3, W4, X1, X2, X3, X4, Y1, Y2, Y3, Y4, Z1, Z2, Z3, and Z4, three signals via each group of conductors W1, W2, W3, W4; X1, X2, X3, X4; Y1, Y2, Y3, Y4; and Z1, Z2, Z3, Z4; respectively, as described above with reference to FIGS. 2–5 and three signals via the group of composite conductors W, X, Y and Z. In this manner, the number of conductors N may be expanded in units of $4^n$ (where n is a natural number, i.e, a positive integer) without limit, such that N−1 signals may be carried by the N conductors. For example, three signals can be transmitted using four ($4^1$) conductors, fifteen signals can be transmitted using sixteen ($4^2$) conductors, 63 signals can be transmitted using 64 (4) conductors, and so on.

Figure 7A:
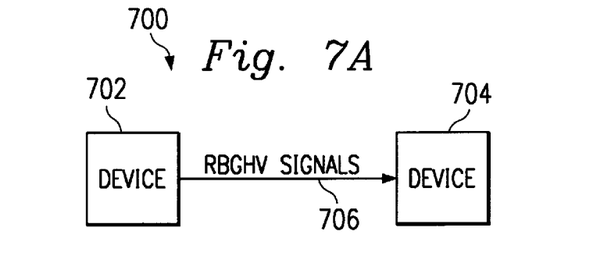
FIG. 7A illustrates an example of point-to-point linkage for use in transmission of RGB signal in accordance with the features of the present invention.
Figure 7B:
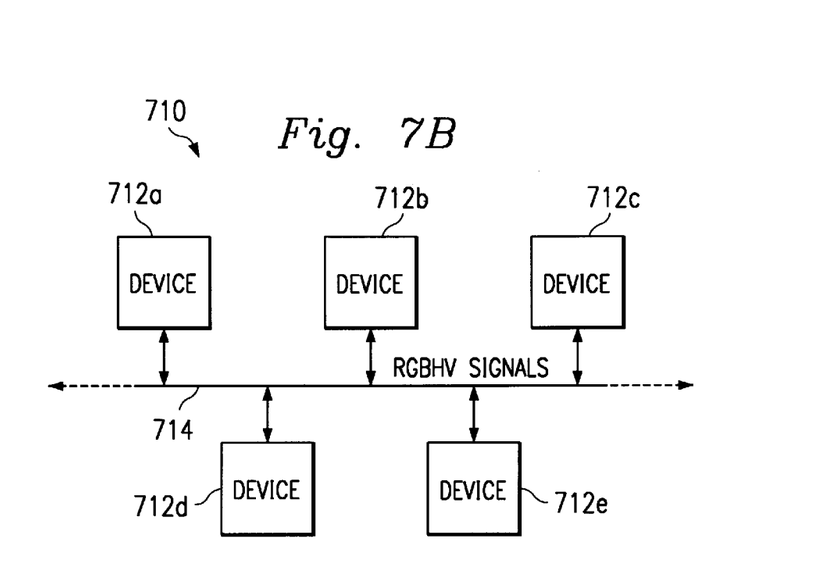
FIG. 7B illustrates an example of network linkage for use in transmitting RGB signals in accordance with the features of the present invention.
Figure 7C:
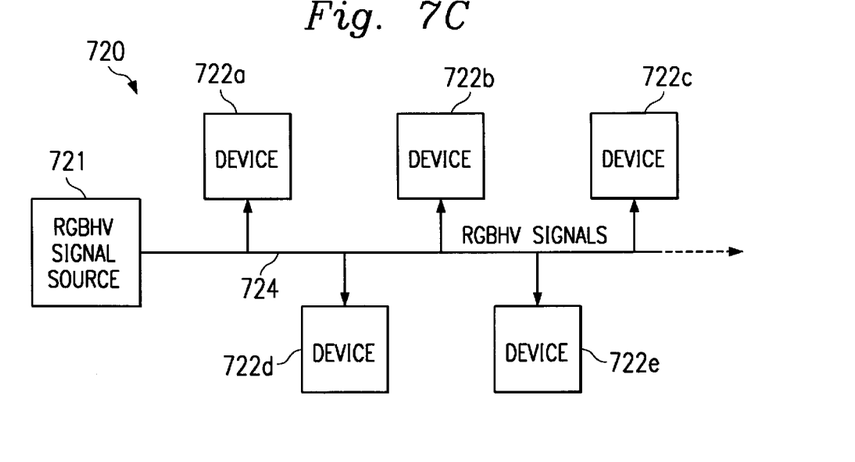
FIG. 7C illustrates an example of distribution linkage for use in transmitting RGB signals in accordance with the features of the present invention.

The technique of the present invention is applicable to consumer, contractor, industrial and computer markets and is generally manifested in either of two forms; specifically, (1) RGB plus sync, or (2) composite video with stereo audio. In RGB plus sync, wide bandwidth, e.g., 25 MHz, RGB video data with imbedded horizontal synchronization ("H") and vertical synchronization ("V") signals are transmitted using a single four conductor bundle. As illustrated in FIGS. 7A–7C, the various applications include point-to-point, network, and distribution linkage. FIG. 7A illustrates an application 700 in which point-to-point linkage is used. In the example shown in FIG. 7A, RGB with imbedded H and V ("RGBHV") signals from a device 702, which may be, for example, a camera, video tape recorder ("VTR"), satellite downlink, or computer, are transmitted directly to a device 704, which may be, for example, a video monitor, a VTR, an satellite uplink, or a computer, via a four-conductor bundle 706. Other examples of point-to-point applications include all other video sources from color graphics adapter ("CGA") through high definition television ("HDTV") as well as applications that currently employ cable connectivity for video, such as broadcast, production, security, teleconferencing, medical, industrial and consumer environments.

FIG. 7B illustrates an application 710 in which a network linkage is used. As shown in FIG. 7B, RGBHV signals are transmitted to and from 712*a*, device 712*b*, device 712*c*, device 712*d* and device 712*e* via one or more four conductor buses, collectively designated by a reference numeral 714. In a network linkage application, a user selects a channel to be shared with others via the link The combination of the low cost of cable, installation, terminations and associated hardware makes the technique of the present invention practical in most situations in which a computer network, typically some type of LAN, needs to be kept unloaded for raw computer data use.

FIG. 7C illustrates application of a distribution linkage. Distribution is a special case of point-to-point in which multiple feeds are required, such as arrival and departure information in airports or information systems in financial institutions. As shown in FIG. 7C, in a distribution linkage application 720, RGBHV signals from a source 721 are distributed to device 722*a*, device 722*b*, device 722*c*, device 722*d* and device 722*e* via one or more four conductor buses 724.

Figure 8:
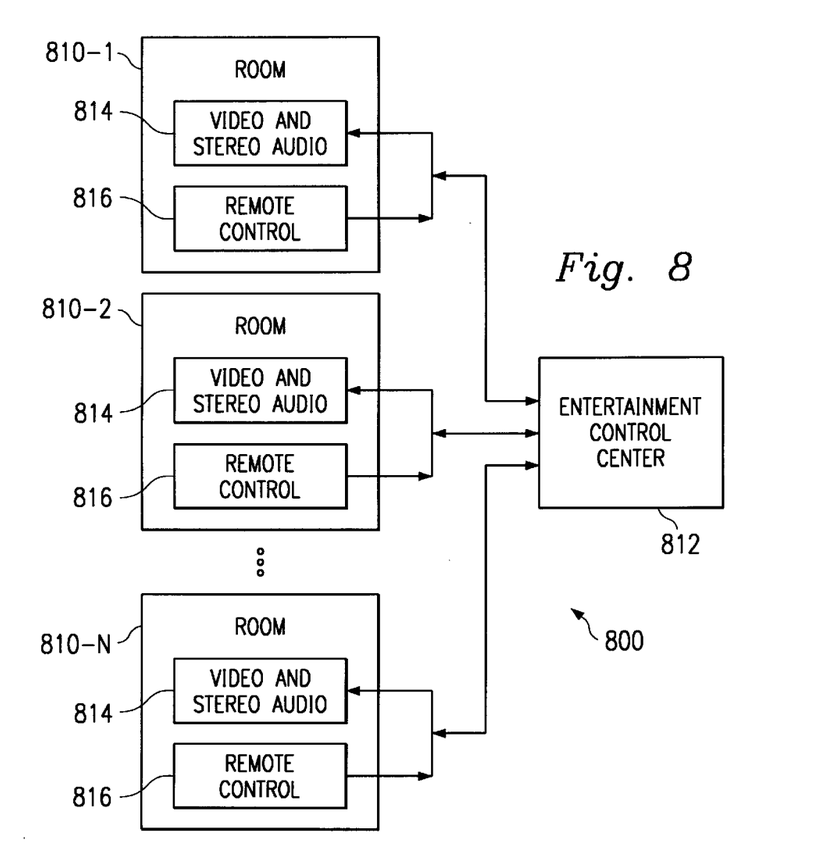
FIG. 8 illustrates an example of a home network with central distribution for use in transmitting composite video with stereo audio signals in accordance with the features of the present invention.

In composite video with stereo audio applications, high performance baseband video is combined with low noise and distortion stereo audio for use in either a consumer home entertainment network or in general multimedia use. As shown in FIG. 8, in a consumer home entertainment network 800, the bidirectionality and piggybacking attributes of the technique of the present invention are exploited to enable devices in various rooms 810-1, 810-2, . . . 810N including video and stereo audio components, collectively designated by a reference numeral 814, and one or more remote control units 816, to communicate with a central entertainment control center 812. An alternative to the network 800 would be a variant of the RGB network shown in FIG. 7B, wherein additional source systems, such as VTRs or laser players, in individual rooms could be added to the network for remote access. For example, if there is a tape in a VTR (not shown) in the central entertainment control center 812 and another tape in a VTR (video and stereo audio subsystem 814) of one of the rooms 810-1, 810-2 . . . 810N both VTRs could be put on the network 800 such that the tapes could be viewed from monitors in the other rooms of the rooms 810-1, 810-2 . . . 810N. Moreover, the bidirectionality and piggybacking features of the technique could be used to expand the information carried on the network 800 to include telephone and intercom signals, as well as security camera feeds.

Figure 9A:
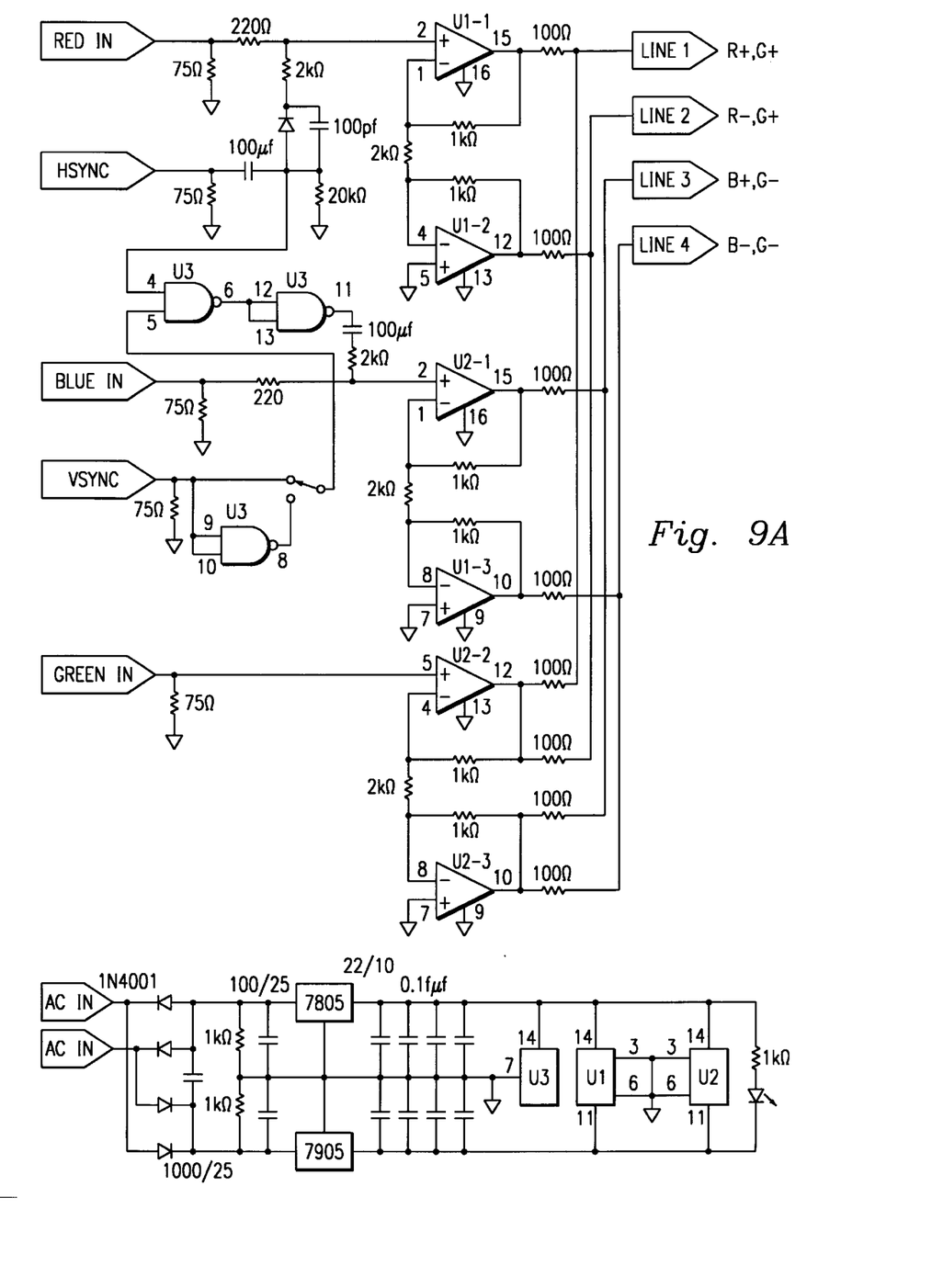
FIGS. 9A and 9B are schematic block diagrams of send and receive circuits, respectively, for a particular RGBHV implementation of the present invention.
Figure 9B:
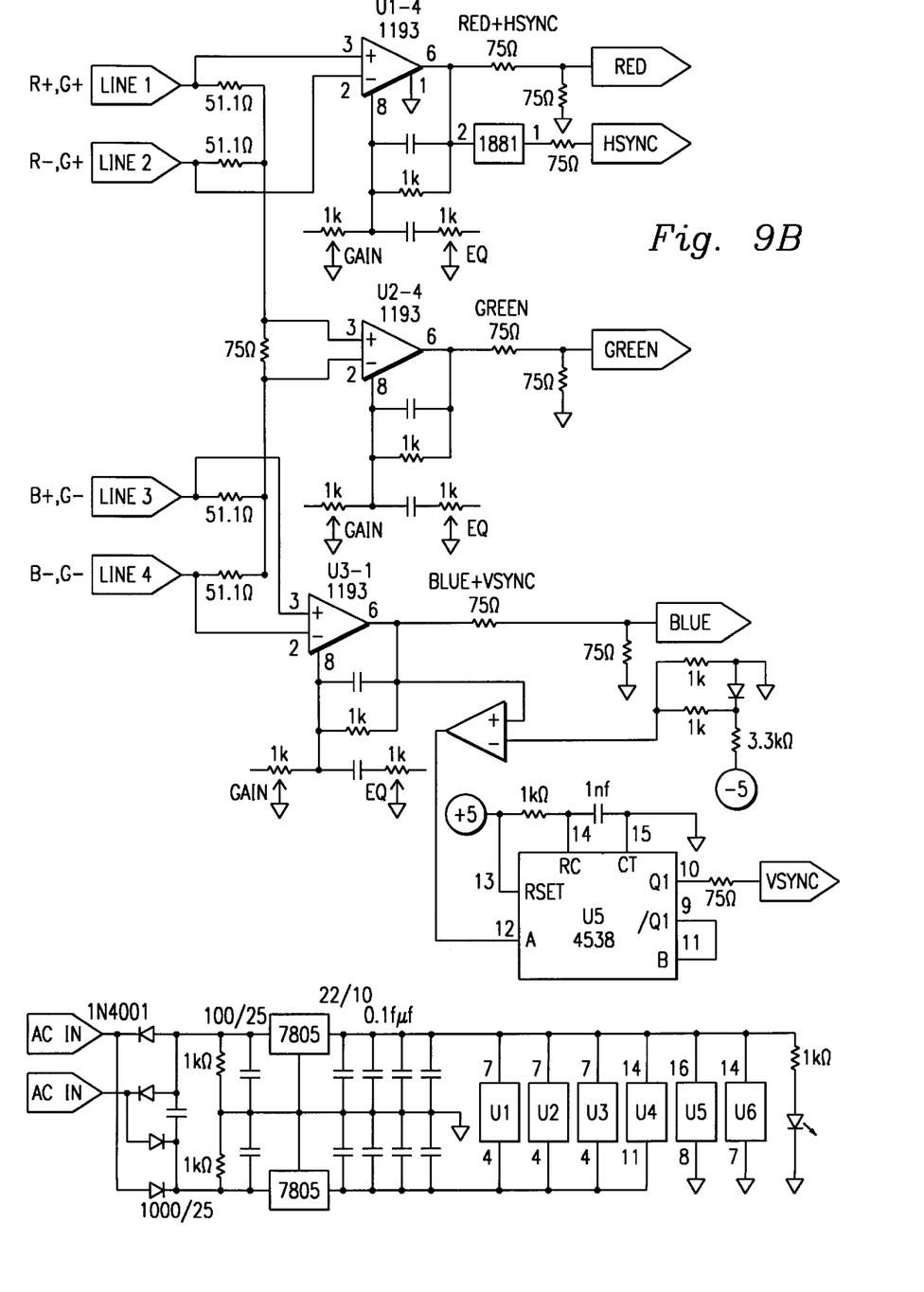

FIGS. 9A and 9B are schematic diagrams of send and receive circuits, respectively, for a particular RGBHV implementation of the present invention. Because the implementation details of the schematic diagrams shown in FIGS. 9A and 9B will be apparent to a skilled artisan from the face thereof, they will not be described in further detail herein. Briefly, however, FIG. 9A illustrates the send circuit which places the components R+ and R− (each with the horizontal synchronization signal H imbedded therein) of a first input signal R onto lines 1 and 2, respectively, the components B+ and B− (each with the vertical synchronization signal V imbedded therein) of a second input signal B onto lines 3 and 4, respectively, the component G+ of a third input signal G onto both lines 1 and 2 and the component G− of the third input signal G onto both lines 3 and 4, all for transmission to the receive circuit. FIG. 9B, on the other hand, illustrates the receive circuit which reassembles the R+H signal from the signals received on lines 1 and 2, reassembles the G signal from the signals received on lines 1,2,3 and 4 and reassembles the B+V signal from the signals received on lines 3 and 4. More specifically, in FIG. 9*a*, the horizontal synchronization signal H is imbedded into the component R+ of the first input signal R by tieing both the first input signal R and the horizontal synchronization signal H to the non-inverting input of amplifier U1-1. The output of the amplifier U1-1 (the component R+ with imbedded horizontal sychronization signal H) is then tied to the inverting input of amplifier U1-2 to produce, at the output thereof, the component R− with imbedded horizontal sychronization signal H. Similarly, the vertical synchronization signal V is imbedded into the component B+ of the second input signal B by tieing both the second input signal B and the vertical synchronization signal V to the non-inverting input of amplifier U2-1. The output of the amplifier U2-1 (the component B+ with imbedded vertical synchronization signal V) is then tied to the inverting input of amplifier U1-3 to produce, at the output thereof, the component B− with imbedded vertical synchronization signal V. Finally, the component G+ is produced by tieing third input signal G to the non-inverting input of amplifier U2-2 and the component G− is produced by tieing the output of the amplifier U2-2 (the component G+) to the inverting input of amplifier U2-3. In FIG. 9B, the components R+ and R− are tied to the non-inverting and inverting inputs of amplifier U1-4, respectively, the B+ and B− components are tied to the non-inverting and inverting inputs of amplifier U3-1, respectively, and the G+ and G− components are tied to the non-inverting and inverting inputs of amplifier U2-4, respectively. In turn, the R, B and G signals are produced at the output of the amplifiers U1-4, U3-1 and U2-4, respectively. In the presently preferred embodiment, circuits such as those shown in FIGS. 9A and 9B would be housed in "black boxes" connected to conventional telephone wiring of the building in which the system is to be used via an RJ connector. Similarly, devices for generating or receiving the signals being transmitted through the system would be connected to the black box in a conventional manner. In this manner existing four-wire telephone cable may be used to transfer a plurality of wideband signals throughout the building.

Figure 10:
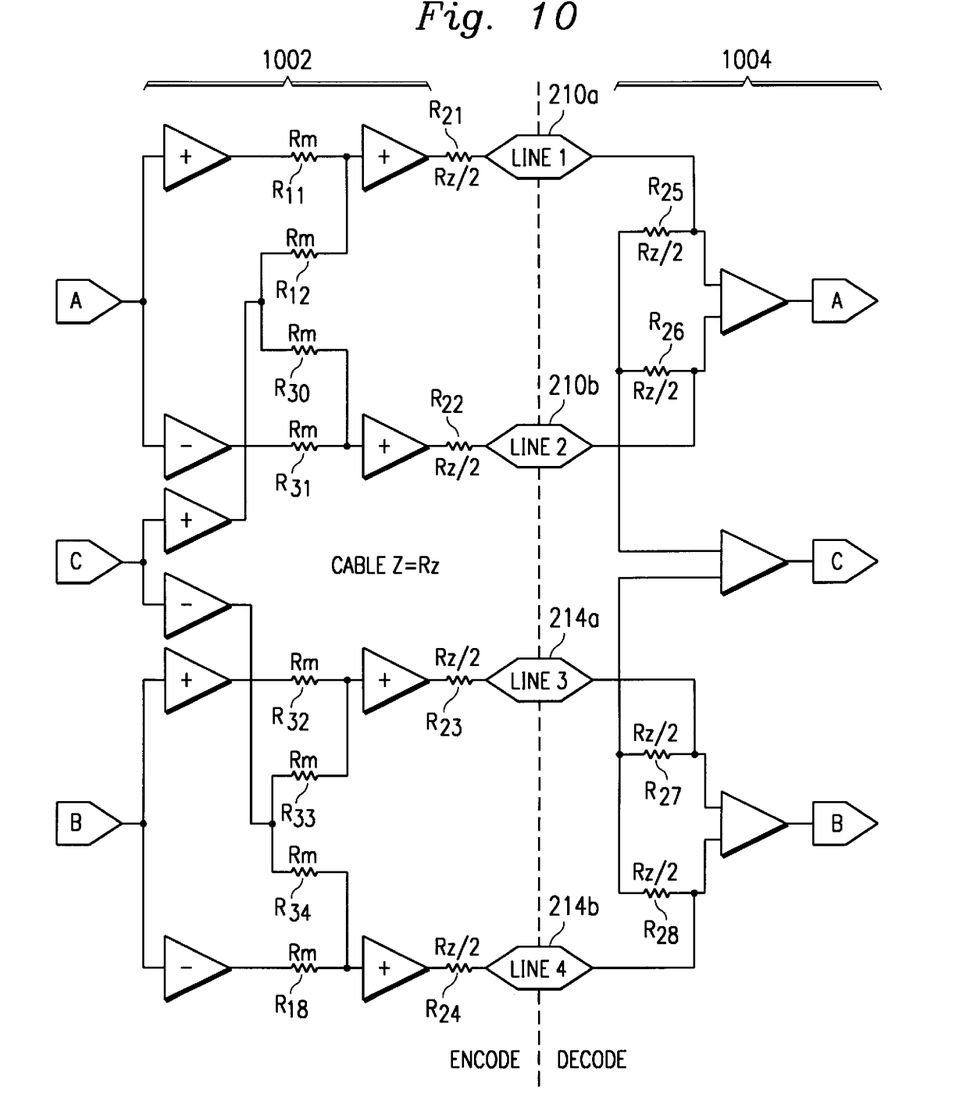
FIG. 10 illustrates an alternate embodiment of a system configured for implementing the technique of the present invention
Figure 11:
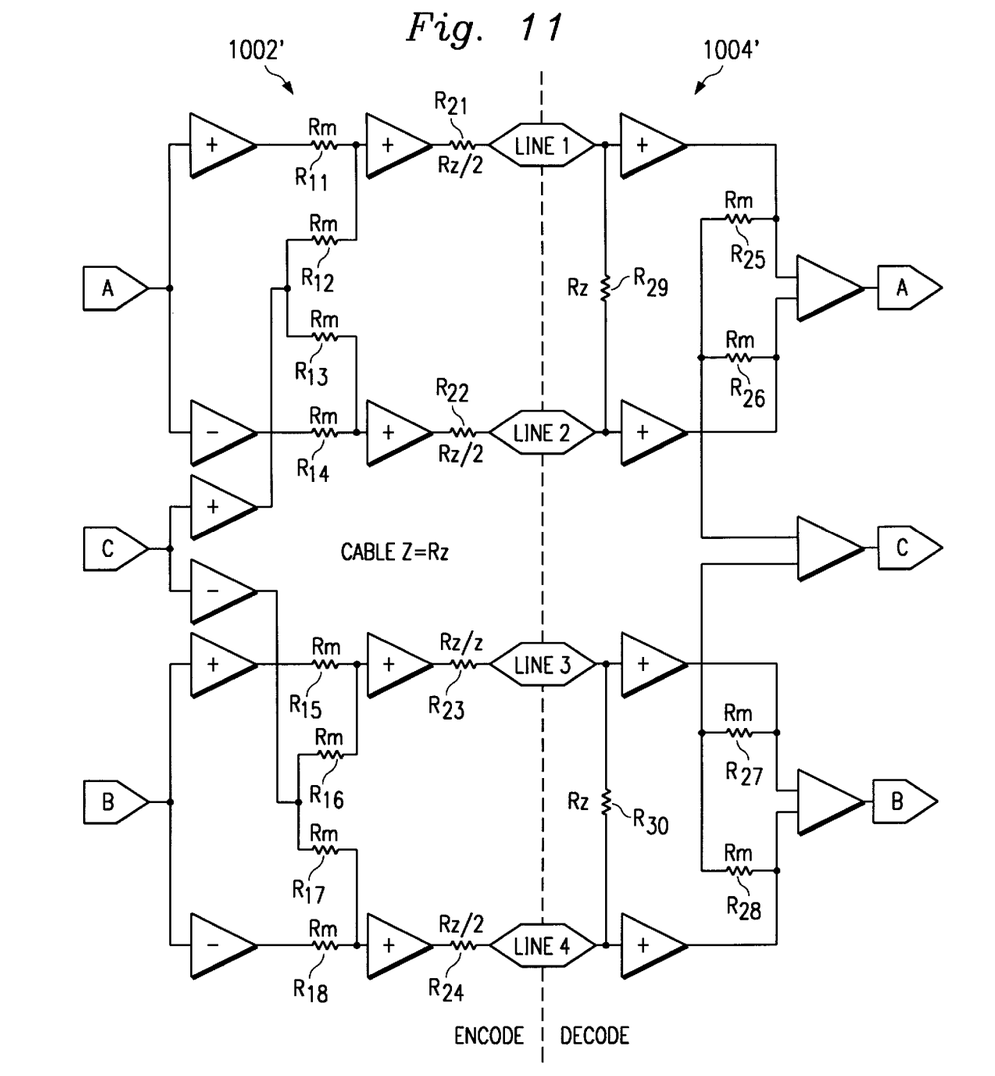
FIG. 11 is a schematic diagram of yet another alternate embodiment of the system of FIG. 5.
Figure 12:
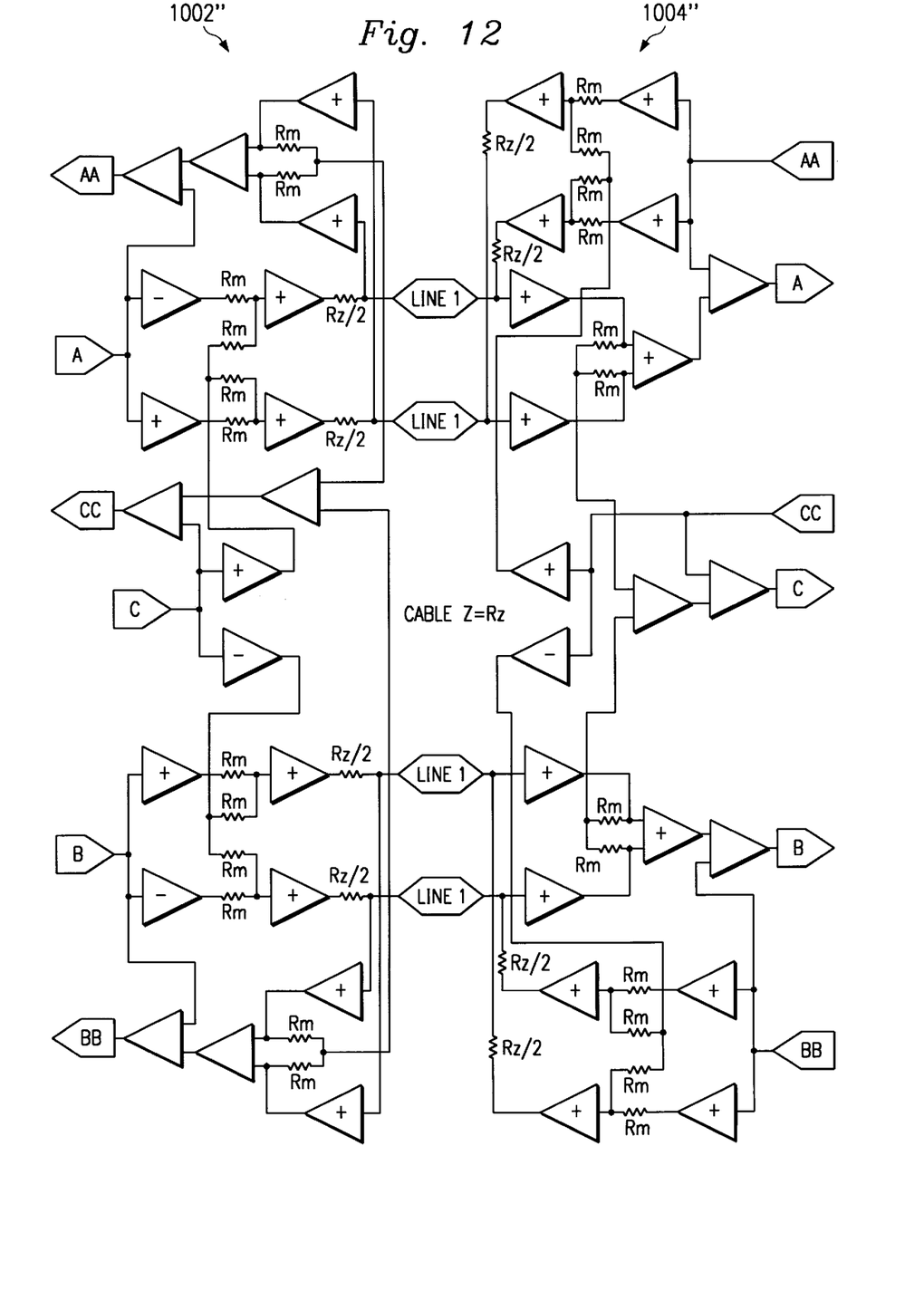
FIG. 12 is a schematic diagram of the system of FIG. 11 configured for bidirectionality.

FIGS. 10–12 are schematic block diagrams of alternate embodiments of the complete system 500 shown in FIG. 5 embodying features of the present invention. FIG. 10, for example, comprises an enode, or send, matrix 1002 similar to the send matrix 502 of FIG. 5, and a decode, or receive, matrix 1004 similar to the receive matrix 504 of FIG. 5. and coupled to the send matrix 1002 by the conductors 210*a*, 210*b*, 214*a* and 214*b*. In contrast to the matrix 502, the send matrix 1002 comprises resistors R11, R12, R30, R31, R32, R33, R34 and R18 each of which has a value of Rm which is chosen for precision and low current needs. The cable 208 has an impedance Z of Rz Ω which becomes the sole determinant of the impedance matching to the cable and can be chosen as would any back terminated drive line driver source resistors. Eight additional resistors R21, R22, R23, R24, R25, R26, R27 and R28 are provided as shown in FIG. 10, each of which resistors have resistances equal to Rz/2 Ω, i.e., half the impedance Z of the cable 208. With respect to FIGS. 11 and 12, those elements which are the same as elements already described with respect to FIG. 10 shall not be described further for clarity of description. However elements unique to FIGS. 11–12 are described below. More specifically, FIG. 11 includes a send matrix 1002' identically configured to the send matrix 1002 of FIG. 10 and a receive matrix 1004' similar to the receive matrix 1004 of FIG. 10 except that each of the resistors R25, R26, R27 and R28 have resistances of $Rm_2$, and two additional resisters R29 and R30, each having a resistance Rz, of are connected in parallel as shown in FIG. 11. The embodiments of FIGS. 5, 10, and 11 may be configured to provide for a bi-directional link as depicted in FIG. 12. In the configuration of FIG. 12, the channels of send matrix 1002" and receive matrix 1004" have been doubled back upon themselves permitting two-way signal passage on the same lines by using input-output subtraction at each output. Because the implementation details of the schematic diagrams shown in FIGS. 10–12 will be apparent to a skilled artisan from the face thereof, they will not be described in further detail herein.

Figure 13:
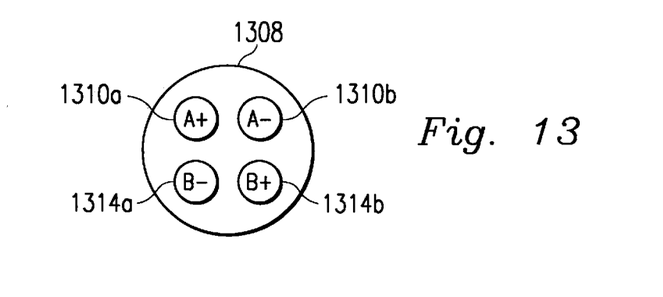
FIG. 13 illustrates a four-conductor cable configured for implementing the technique of the present invention and arranged in an adjacent mode wiring pattern.

It is understood that the present invention can take many other forms and embodiments, and that the embodiments shown herein are intended to illustrate rather than limit, the invention, it being understood that variations may be made without departing from the spirit of the scope of the invention. For example, in contrast to the opposite mode pattern wiring described in the foregoing discussion, the wiring may be arranged in an adjacent mode pattern, as shown in the FIG. 13, wherein, in a cable 1308, the components A+, A−, of a first balanced mode signal A are respectively carried on a first pair of adjacent conductors 1310a, 1310b, and the components B+, B−, of a second balanced mode signal B are respectively carried on a second pair of adjacent conductors 1314a, 1314b. It is understood, too, that the present invention is not limited to wide bandwidth use, e.g., use in bandwidths exceeding 25 MHz, but may be used with narrower bandwidths as well, or even wider bandwidths if compensation is provided, for example, by reducing the length of cable over which signals are sent.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of transmitting three balanced mode signals using two pairs of conductors, the method comprising:
    transmitting a first one of said balanced mode signals on a first pair of said two pairs of conductors;
    transmitting a second one of said balanced mode signals on a second pair of said two pairs of conductors;
    synthesizing a third pair of conductors from said first and second pairs of conductors;
    transmitting a third one of said balanced mode signals using said synthesized third pair of conductors; and
    piggybacking additional low bandwidth signals on one or more of said three balanced mode signals for transmission therewith.

2. A method of transmitting three balanced mode signals using two pairs of conductors, the method comprising the steps of:
    transmitting a first one of said three balanced mode signals on a first pair of said two pairs of conductors;
    transmitting a second one of said three balanced mode signals on a second pair of said two pairs of conductors;
    synthesizing a third pair of conductors from said first and second pairs of conductors;
    transmitting a third one of said three balanced mode signals using said synthesized third pair of conductors;
    using first, second and third virtual ground planes created by said three balanced mode signals on said first, second and third pairs of conductors, respectively, to electrically isolate said three balanced mode signals from one another.

3. A method of transmitting three balanced mode signals using two pairs of conductors, the method comprising the steps of:
    transmitting a first one of said three balanced mode signals on a first pair of said two pairs of conductors;
    transmitting a second one of said three balanced mode signals on a second pair of said two pairs of conductors;
    synthesizing a third pair of conductors from said first and second pairs of conductors; and
    transmitting a third one of said three balanced mode signals using said synthesized third pair of conductors;
    said three balanced mode signals on said first, second and third pairs of conductors generating first, second and third virtual ground planes, respectively;
    said first, second and third pairs of conductors arranged such that said first, second and third pairs of conductors are electrically isolated from one another by said first, second and third virtual ground planes.

4. The method of claim 3 wherein said synthesizing is performed using an encode resistor matrix, coupled to said first and second ones of said two pairs of conductors, such that said third one of said three balanced mode signals is shared equally by said first and second conductor pairs.

5. The method of claim 1 wherein said three balanced mode signals comprise wide bandwidth RGB video data with imbedded vertical and horizontal sync signals.

6. The method of claim 1 further comprising transmitting one or more of said three balanced mode signals in opposite directions simultaneously.

7. The method of claim 1 further comprising arranging said first and second pairs of said two pairs of conductors in an adjacent mode pattern.

8. The method of claim 1 wherein said two pairs of conductors comprise a four-wire telephone cable.

9. The method of claim 1 wherein said three balanced mode signals comprise stereo audio and video signals.

10. The method of claim 1 further comprising arranging said first and second pairs of said two pairs of conductors in an opposite mode pattern.

11. A method of transmitting three balanced mode signals using two pairs of conductors, the method comprising:
    transmitting a first one of said three balanced mode signals on a first pair of said two pairs of conductors;
    transmitting a second one of said three balanced mode signals on a second pair of said two pairs of conductors;
    synthesizing a third pair of conductors from said first and second pairs of conductors;
    transmitting a third one of said three balanced mode signals using said synthesized third pair of conductors; and
    piggybacking additional low bandwidth signals on one or more of said three balanced mode signals for transmission therewith.

12. A system for using four-conductor cable to transmit three balanced mode signals, the system comprising:
    an encode matrix coupled to first and second pairs of conductors of said four-conductor cable, said encode matrix transmitting a first balanced mode signal via said first pair of conductors of said four-conductor cable, a second balanced mode signal via said second pair of conductors of said cable, and a third balanced mode signal via a third pair of conductors synthesized from said first and second pairs of conductors; and
    a decode matrix coupled to said first and second pairs of conductors of said cable and connected to said encode matrix via said first and second pairs of conductors of said cable, said decode matrix comprising a plurality of resistors, said plurality of resistors of said decode matrix recovering said first, second and third balanced mode signals from said cable;

wherein one of said plurality of resistors comprises a load resistor for said third signal.

13. The system of claim 12 wherein said load resistor has a resistance which is fifty percent (50%) greater than an impedance associated with said four-conductor cable.

14. A method of transmitting a first number of balanced mode signals using a second number of conductors, the method comprising the steps of:
  a. transmitting a first one of said first number of balanced mode signals using a first pair of said second number of conductors;
  b. transmitting a second one of said first number of balanced mode signals using a second pair of said second number of conductors;
  c. synthesizing a third pair of conductors from said first and second pairs of conductors;
  d. transmitting a third one of said first number of balanced mode signals using said synthesized third pair of conductors;
  e. said first one of said first number of balanced mode signals, said second one of said first number of balanced mode signals and said third one of said first number of balanced mode signals on said first pair of said second number of conductors, said second pair of said second number of conductors and said third pair of conductors synthesized from said first and second pairs of conductors, respectively, generating first, second and third virtual ground planes, respectively;
  f. said first pair of said second number of conductors, said second pair of said second number of conductors and said third pair of conductors synthesized from said first and second pairs of conductors arranged such that said first pair of said second number of conductors, said second pair of said second number of conductors and said third pair of conductors synthesized from said first and second pairs of conductors are electrically isolated from one another by said first, second and third virtual ground planes; and
  g. repeating steps a–f for the remainder of said first number of balanced mode signals and said second number of conductors.

15. The method of claim 4, wherein said second number is equal to $4^n$, where n is a natural number.

16. The method of claim 14 wherein said synthesizing is performed using an encode resistor matrix, coupled to said first pair of said second number of conductors and said second pair of said second number of conductors, for causing each of said third one of said first number of balanced mode signals to be shared equally by said respective first pair of said second number of conductors and said second pair of said second number of conductors from which said corresponding third conductor pair is synthesized.

17. The method of claim 4 wherein said first and second conductor pairs comprise telephone cable.

18. The method of claim 4 further comprising transmitting one or more of said first number of balanced mode signals in opposite directions simultaneously on said respective conductor pair.

19. The method of claim 4 further comprising arranging said first and second pairs of conductors in an adjacent mode pattern.

20. The method of claim 4 further comprising arranging said first and second pairs of conductors in an opposite mode pattern.

21. A method of transmitting a first number of balanced mode signals using a second number of conductors, the method comprising the steps of:
  a. transmitting a first one of said first number of balanced mode signals using a first pair of said second number of conductors;
  b. transmitting a second one of said first number of balanced mode signals using a second pair of said second number of conductors;
  c. synthesizing a third pair of conductors from said first and second pairs of conductors;
  d. transmitting a third one of said first number of balanced mode signals using said synthesized third pair of conductors;
  e. using a first virtual ground plane created by said first one of said first number of balanced mode signals using said first pair of said second number of conductors, a second virtual ground plane created by said second one of said first number of balanced mode signals using said second pair of said second number of conductors and a third virtual ground plane created by said third one of said first number of balanced mode signals using said third pair of conductors synthesized from said first and second pair of conductors to electrically isolate said first number of balanced mode signals from one another;
  f. repeating steps a–d for the remainder of said first number of balanced mode signals and said second number of conductors.

22. Apparatus for transmitting three balanced mode signals using two pairs of conductors, the apparatus comprising:
  means for transmitting a first one of said three balanced mode signals on a first pair of said two pairs of conductors;
  means for transmitting a second one of said three balanced mode signals on a second pair of said two pairs of conductors;
  means for synthesizing a third pair of conductors from said first and second pairs of conductors;
  means for transmitting a third one of said three balanced mode signals using said synthesized third pair of conductors; and
  means for electrically isolating said first, second and third ones of said three balanced mode signals from one another using first, second and third virtual ground planes created by said first, second and third ones of said three balanced mode signals on said first, second and third pairs of conductors, respectively.

23. The method of claim 22 wherein said first and second pairs of said two pairs of conductors are arranged in an adjacent mode pattern.

24. The method of claim 22 wherein said first and second pairs of said two pairs of conductors are arranged in an opposite mode pattern.

25. The apparatus of claim 22 further comprising an encode resistor matrix, coupled to said first and second ones of said two pairs of conductors, for performing said synthesizing, said encode resistor matrix causing said third one of said three balanced mode signals to be shared equally by said first and second conductor pairs.

26. The apparatus of claim 22 wherein said three balanced mode signals comprise wide bandwidth RGB video data with imbedded vertical and horizontal sync signals.

27. The apparatus of claim 22 wherein one or more of said three balanced mode signals can be transmitted in opposite directions simultaneously.

28. The apparatus of claim 22 wherein said three balanced mode signals comprise stereo audio and video signals.

29. The apparatus of claim 22 wherein said two pairs of conductors comprise a four-wire telephone cable.

30. Apparatus for transmitting three balanced mode signals using two pairs of conductors, the apparatus comprising:
- means for transmitting a first one of said three balanced mode signals on a first pair of said two pairs of conductors;
- means for transmitting a second one of said three balanced mode signals on a second pair of said two pairs of conductors;
- means for synthesizing a third pair of conductors from said first and second pairs of conductors; and
- means for transmitting a third one of said three balanced mode signals using said synthesized third pair of conductors;
- wherein additional low bandwidth signals are piggybacked on one or more of said three balanced mode signals for transmission therewith.

31. A system for using four-conductor cable to transmit three balanced mode signals, the system comprising:
- an encode matrix coupled to first and second pairs of conductors of said fourconductor cable, said encode matrix transmitting a first balanced mode signal via first and second conductors of said four-conductor cable, a second balanced mode signal via third and fourth conductors of said four-conductor cable, and a third balanced mode signal via a third pair of conductors synthesized from said first, second, third and fourth conductors of said four-conductor cable; and
- a decode matrix coupled to said first, second, third and fourth conductors of said four-conductor cable and connected to said encode matrix via said first, second, third and fourth conductors of said four-conductor cable, said decode matrix recovering said first, second and third balanced mode signals from said fourconductor cable; wherein:
- first and second components of said first balanced mode signal are transmitted over said first and second conductors, respectively;
- first and second components of said second balanced mode signal are transmitted over said third and fourth conductors, respectively;
- a first component of said third balanced mode signal is transmitted over each of said first and fourth conductors; and
- a second component of said third balanced mode signal is transmitted over each of said second and third conductors.

32. The system of claim 31 wherein said first, second, third and fourth conductors are arranged in an adjacent mode pattern.

33. The system of claim 31 wherein said first, second, third and fourth conductors are arranged in an opposite mode pattern.

34. The system of claim 31 further comprising:
- at least one device connected to inputs of said encode matrix for generating said first, second and third balanced mode signals; and
- at least one device connected to outputs of said decode matrix for receiving said recovered first, second and third balanced mode signals.

35. The system of claim 31 wherein said encode matrix comprises eight equal resistors for creating summing nodes at each of said first, second, third and fourth conductors of said four-conductor cable coupled to said encode matrix.

36. The system of claim 31 wherein said decode matrix comprises a plurality of resistors for recovering said first, second and third balanced mode signals from said first, second, third and fourth conductors of said four-conductor cable coupled to said decode matrix.

37. A system for using four-conductor cable to transmit three balanced mode signals, the system comprising:
- an encode matrix coupled to first and second pairs of conductors of said four-conductor cable, said encode matrix comprising eight equal resistors for creating summing nodes at each of said first and second pairs of conductors of said four-conductor cable, said encode matrix transmitting a first balanced mode signal via said first pair of conductors of said four-conductor cable, a second balanced mode signal via said second pair of conductors of said four-conductor cable, and a third balanced mode signal via a third pair of conductors synthesized from said first and second pairs of conductors; and
- a decode matrix coupled to said first and second pairs of conductors of said four-conductor cable and connected to said encode matrix via said first and second pairs of conductors of said four-conductor cable, said decode matrix recovering said first, second and third balanced mode signals from said four-conductor cable;
- wherein each of said resistors has a resistance which is equal to two times an impedance associated with said four-conductor cable.

* * * * *